(12) United States Patent
Gapontsev et al.

(10) Patent No.: US 8,081,667 B2
(45) Date of Patent: Dec. 20, 2011

(54) SINGLE-MODE HIGH POWER MULTIMODE FIBER LASER SYSTEM

(76) Inventors: Valentin P. Gapontsev, Worcester, MA (US); Nikolai Platonov, Worcester, MA (US); Valentin Fomin, Burbach (GE); Michael Vyatkin, Fryazino (RU)

( * ) Notice: Subject to any disclaimer, the term of this patent is extended or adjusted under 35 U.S.C. 154(b) by 0 days.

(21) Appl. No.: 12/630,545

(22) Filed: Dec. 3, 2009

(65) Prior Publication Data

US 2011/0064097 A1    Mar. 17, 2011

Related U.S. Application Data

(63) Continuation of application No. 12/559,284, filed on Sep. 14, 2009.

(51) Int. Cl.
  *H01S 3/30*  (2006.01)
  *H01S 3/098*  (2006.01)
(52) U.S. Cl. .................. 372/6; 372/18; 372/19
(58) Field of Classification Search .............. 372/6, 18, 372/19, 54, 66
  See application file for complete search history.

(56) References Cited

U.S. PATENT DOCUMENTS

| | | | |
|---|---|---|---|
| 5,818,630 A | 10/1998 | Fermann et al. | |
| 6,014,396 A | 1/2000 | Osinski | |
| 6,018,533 A | 1/2000 | Krivoshlykov | |
| 6,324,326 B1 * | 11/2001 | Dejneka et al. | ............... 385/123 |
| 7,400,807 B2 | 7/2008 | Minelly et al. | |
| 7,526,165 B2 | 4/2009 | Nielsen et al. | |
| 2005/0243409 A1 | 11/2005 | Harter et al. | |
| 2005/0265653 A1 | 12/2005 | Cai et al. | |

* cited by examiner

*Primary Examiner* — Armando Rodriguez

(57) ABSTRACT

A high power single mode fiber laser system is configured with an active fiber including coextending multimode core (MM) and cladding around the MM core. The MM core is doped with one or more ions selected from rare earth and transitional metals and has a bottleneck cross in accordance with one aspect of the disclosure. The bottleneck cross-section includes a relatively small uniformly dimensioned input end region, a frustoconical region and a relatively large uniformly dimensioned amplifying region. The refractive step index of the MM core is configured with a central dip shaped and dimensioned along the input region so as not to disturb a Gaussian field profile of fundamental mode, gradually transform the Gaussian field profile into the ring profile of the fundamental mode and support the latter along the amplifying region. In accordance with a further aspect, the core is further provided with an output transforming region with the dip which gradually shapes the ring field profile in the Gaussian field profile further distortlessly supported by the output end region. A variety of end and side pumping arrangements are employed with the structures configured in accordance with the first and second aspects.

20 Claims, 2 Drawing Sheets

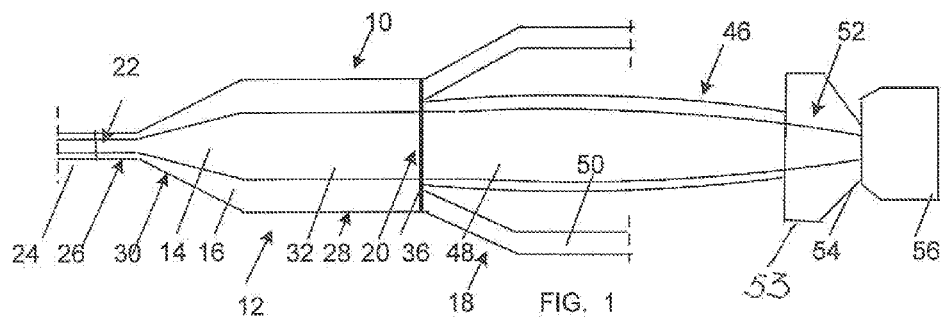
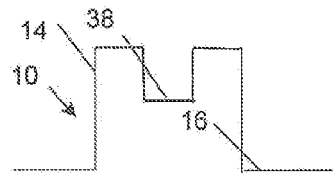
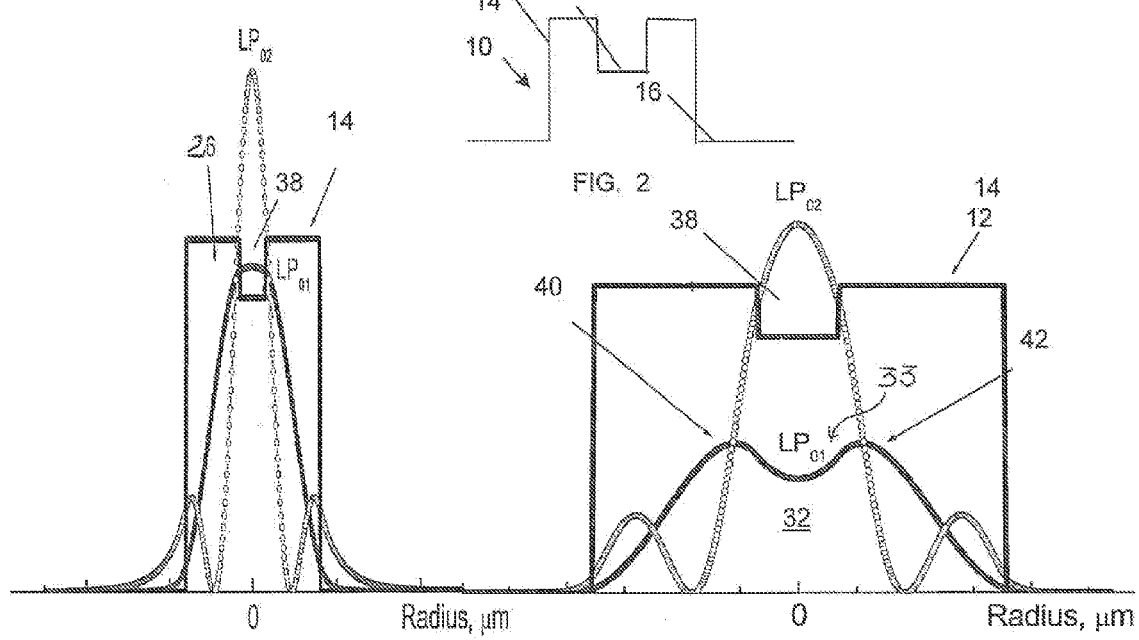
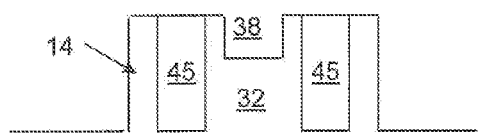
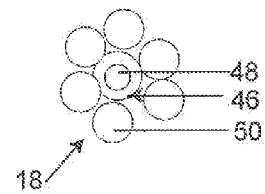

SINGLE-MODE HIGH POWER MULTIMODE FIBER LASER SYSTEM

CROSS-REFERENCE TO RELATED APPLICATIONS

The application is continuation-in-part of U.S. patent application Ser. No. 12/559,284 field with the US PTO on Sep. 14, 2009 and fully incorporated herein by reference.

BACKGROUND OF THE DISCLOSURE

1. Technical Field

This disclosure relates to a single mode high power fiber laser system configured with a multimode fiber capable of guiding light in a substantially fundamental mode.

2. Known Art Discussion

Numerous applications of fiber laser systems are in need of a high-power, high-quality beam. Fiber lasers utilizing SM active fibers are limited in power due to the onset of optical nonlinearities. One common solution is the use a MM active fiber capable of supporting a few high-order modes (HOM) but configured to prevent the excitation and amplification of these HOMs.

Yet the power scaling of single mode high power (SMHP) fiber laser systems with such MM fibers is also somewhat limited by the presence of nonlinearities including, but not limited to, Stimulated Raman Scattering (SRS). Perhaps one the most efficient practical approaches, leading to a relatively high optical nonlinearity threshold, is to decrease the power density inside the core of a MM fiber by increasing the core diameter, decreasing a numerical aperture and also decreasing the effective length of non-linear interaction. Unfortunately, this geometry is not easily attainable for the following reasons. First, the increase of the core diameter results in the increased number of HOMs which can be easily excited that detrimentally affects the quality of the output beam. Second, the manufacturing of high quality fibers with truly very low Δn is highly challenging. Third, such fibers are sensitive to bending loads.

A need, therefore, exists for a SMHP system provided with at least one active MM fiber substantially free from problems associated with the known prior art systems.

Another need exists for a SMHP system provided with a MM active fiber which has a refractive core index with the increased effective area of the excited fundamental mode and higher thresholds for nonlinearities if compared to those of the known SMHP systems.

Still another need exists for a SMHP system with an active multimode MM fiber which is configured with a dopant profile capable of amplifying substantially only a fundamental mode while minimizing the possibility of coupling thereof to peripheral and central symmetrical high order modes.

SUMMARY OF THE DISCLOSURE

All of the above-specified and other needs are met by a SMHP fiber laser system including a MM active fiber which is configured to support substantially only a fundamental mode, has a geometry providing mode matching between the active and passive fused fibers and operate at high powers with a high threshold for nonlinearities.

In accordance with one aspect, the disclosed SMHP fiber laser system is configured with an input SM passive fiber spliced directly to a MM active fiber so that light, radiated from the input fiber in a single mode with a Gaussian field profile, is launched into the MM fiber without substantial coupling losses. In a particular structural embodiment, the MM active fiber gas a bottleneck-shaped section which is defined by a relatively narrow input end region, gradually expanding, frustoconical transformer region and relatively wide, uniformly dimensioned amplifying region.

The input end region of the MM core is configured substantially identically to the output end of the passive SM fiber core. As a consequence, the launched SM excites in the end region of the MM fiber substantially only a fundamental mode with a mode field diameter (MFD) substantially matching that one of the launched SM. The transformer and amplifying regions are structured to maintain the propagation of the exited fundamental mode while minimizing the coupling thereof with high order modes (HOMs).

In accordance with a further aspect of the disclosure, the MM active fiber has a step-index profile which is provided with a dip extending into the central core area and configured to controllably transform the Gaussian field profile of the excited fundamental mode into the ring profile of this mode. The ring profile has a substantially larger effective area than the Gaussian profile. The larger effective area of the fundamental mode minimizes the amplification of certain HOMs which, in turn, largely preserves a substantial portion of the overall light energy/power in the fundamental mode. The less power loss in the fundamental mode, the more effective the high-power SM laser system.

The dip has a relatively large geometrical dimension along the amplifying core region of the MM fiber which, even without the dip, has a relatively low power density if compared to the input end region of the MM core. The lower the density, the higher the threshold for non-linearities, the better the power-handling capacity of the fiber laser. The formation of the dip allows for even a higher threshold because the field intensity I tends to lower with the increased mode area A, i.e., I~P/A where P is power.

In accordance to a further aspect, the coupling losses in the splice region defined between the output end region of the MM fiber and an output SM passive fiber is further minimized by specifically structuring the dip along the both input and output end regions of the MM fiber core. Since the input and output SM passive fibers each are configured to support propagation of SM radiation with a Gaussian filed profile, if left unchanged the ring-shaped profile will mismatch the Gaussian profile. In practical terms, this mismatch would lead to power losses at the output splice and excitation of HOMs at the input splice. To avoid the power loss due to the intensity field difference, the MM fiber is structured with a double bottleneck shape, i.e. it has additional gradually narrowing output transformer and output end regions structured substantially identically to the input end and transformer core regions of the MM fiber. The dip, however, is so small along both end regions that the Gaussian mode is not disturbed. Accordingly, the dip is small along the input region, gradually expands along the input transformer region reaching its largest and uniform dimension along the amplifying region only to gradually narrow along the output transformer region to the small size along the output end region. The gradual modification of the dip's geometry along the input and output transformer regions substantially prevents the possibility of HOM excitation along these regions.

In accordance with still a further aspect, the disclosed MM active fiber has a step index profile structure configured with a dopant ring profile so as to provide a substantial gain to the fundamental mode, but minimize the amplification of central symmetrical modes, such as LP02. The dopant ring profile is configured to significantly amplify the fundamental mode and, particularly, the peaks of the ring field profile of the fundamental mode while minimizing amplification of HOMs.

BRIEF DESCRIPTION OF THE DRAWING

These and other features, aspects and advantages of the present invention will become better understood with reference to the following description, appended claims, and accompanying drawings where:

FIG. 1 a diagrammatic view of one embodiment of single mode high power fiber laser system which has an active MM fiber configured with a bottleneck-shaped cross section and pumped in accordance with an end-pumping technique.

FIG. 2 illustrates the refractive index profile of the MM fiber of FIG. 1.

FIG. 3 illustrates the refractive index and intensity field profiles of respective central symmetric and fundamental modes along end regions of the disclosed MM fiber.

FIG. 4 illustrates the refractive index and intensity field profiles of respective central symmetric and fundamental modes along a central region of the MM fiber.

FIG. 5 illustrates the refractive step-index of the disclosed MM fiber having its core provided with a ring-shaped dopant profile.

FIG. 6 is a front view of pump utilized in the system of FIG. 1.

SPECIFIC DESCRIPTION

Figure 7:
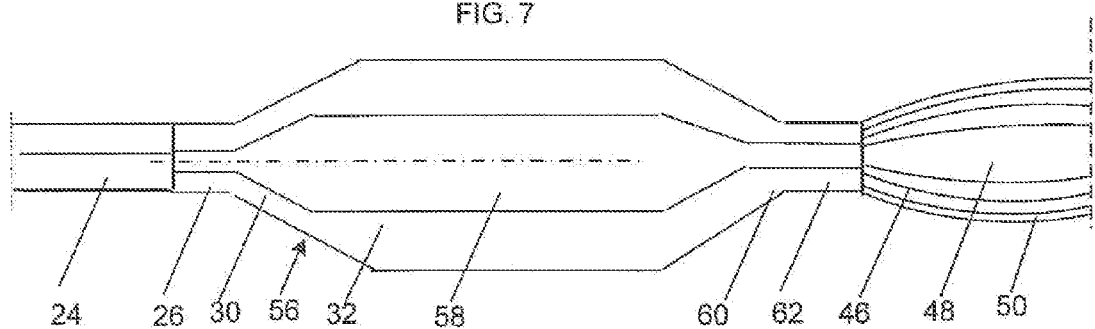
FIG. 7 illustrates a further embodiment of the disclosed system utilizing an end-pumping arrangement.

Reference will now be made in detail to the disclosed embodiments of SM high-power fiber laser system. Wherever possible, same or similar reference numerals are used in the drawings and the description to refer to the same or like parts. The drawings are in simplified form and are far from precise scale.

FIG. 1 illustrates a single-mode high power (SMHP) fiber laser system 10 including, among others, an amplifier 12 and a pump unit 18 which launches pump light into an output end 20 of amplifier 12 in accordance with an end pumping technique. The SMHP fiber laser system 10 operates so that upon coupling a SM radiation into an input end 22 of amplifier 12 by passive fiber 24, substantially only a fundamental mode is exited at the amplifier's input.

The amplifier 12 is configured with a MM core 14, which is doped with one or more rare earth ions, and one or more claddings 16 (only one is shown) coextending with and surrounding the MM core. The MM core 14 and cladding 16 have respective bottleneck-shaped cross-sections each including a narrow uniformly dimensioned input end region 26, uniformly dimensioned amplifying region 28, which is wider than the input region, and a frustoconical input transformer region 30 bridging the end and amplifying core regions.

The excitation of substantially only a fundamental mode at input end region 22 of MM core 14 occurs as a result of the geometry of the output and input core regions of respective input passive fiber 24 and MM active fiber of amplifier 12. In particular, the fused output and input core regions of the respective fibers are configured so that the mode field diameter (MFD) of the input SM radiation, emitted from the core of passive fiber 24, substantially matches the MFD of the fundamental mode supported by input end region 26 of MM core 14. Furthermore, the fused core ends of passive fiber 24 and amplifier 12, respectively, are configured so that the input SM and exited fundamental mode have respective Gaussian field profiles.

A combination of substantially matching MFDs and shapes of the respective passive and active fibers allows for a substantially lossless coupling of the SM radiation into MM core 14. Furthermore, the substantial uniformity of launched and excited modes minimizes the possibility of the HOM excitation at the input of MM core 14.

The SMHP system 10 is designed to operate within a broad range of powers capable of reaching tens of kW. Hence the power density of light propagating along amplifier 12 is also high. High power densities tend to lower a threshold for nonlinearities which, as known to one of ordinary skilled in the laser arts, detrimentally affect the characteristics of fiber laser systems. To reduce the light power density, amplifying core region 32 of MM core 14 has a diameter greater than that one of input end core region 26. Accordingly, the enlarged core of amplifying region 32 allows for better power handling characteristics. However, the increased core diameter is typically associated with the increased and highly undesirable possibility of HOMs' excitation. Accordingly, it is desirable to increase the MFD of fundamental mode $LP_{01}$ which would minimize the possibility of HOMs excitation.

As shown in FIG. 2 discussed in conjunction with FIG. 1 and illustrative of all embodiments of the present disclosure, the increased MFD is realized by providing a central dip 38 in the refractive index profile of core 14. The dip 38 is structured to transform the Gaussian field profile of the excited fundamental mode at input core region 26 into a ring-shaped profile which overlaps the larger core area along amplifying region 32 than the Gaussian field profile, if the latter was not transformed. However, the instantaneous transformation of the field profile into the ring one may be problematic due to the possibility of HOMs excitation. Consequently, dip 38 has a variable configuration along amplifier 12, as explained immediately below.

FIG. 3, discussed in the context of FIG. 1 and also applicable to all embodiments disclosed hereinbelow, illustrates the disclosed refractive step-index of core 14 along input end region 26 provided with uniformly dimensioned dip 38 configured so as to minimally distort the Gaussian shape of the excited fundamental mode $LP_{O1}$. Preferably, the width of dip 38 along end regions 26 varies within a range between about 1λ and about 5λ, where λ is a given wavelength at which active core 14 is capable of supporting substantially only the fundamental mode. The disclosed configuration of amplifier 12 is considered to have a substantially ideal configuration. However, even such a configuration may allow for excitation certain HOMs, such as central high order mode $LP_{02}$.

As the fundamental mode continues to propagate along input transformer region 30, the Gaussian field profile gradually transforms into the ring field profile due to the gradual enlargement of dip 38. The larger the dip, the more ring-like the fundamental mode, as discussed below.

FIG. 4 relates to all embodiments of the present disclosure and illustrates the largest dimension of dip 38 associated with the articulated ring profile of fundamental mode which occurs when the latter enters central region 32 of MM active core 14. The ring profile of fundamental mode $LP_{01}$ includes two energy peaks 40 and 42, respectively, and a centrally located valley 33 bridging the peak regions. Thus, the ring profile spreads out occupying a greater area of core 14 than a Gaussian profile. The dip 38 may be realized by controllably doping the central region of core 14, preferably, with ions of fluoride. Alternatively, ions of boron may be used. Still another possibility is to controllably dope the central core region with a concentration of phosphate different from that one in the peripheral regions of core 14. It can be easily observed that the presence of dip 38 along amplifying region 32 minimizes the peak intensity of $LP_{02}$ in central index region. Furthermore, the wings of fundamental mode $LP_{01}$ extract a lion's share of pump power leaving the wings of central HOM $LP_{02}$ practically without a gain.

Referring to FIG. 5 discussed in combination with FIGS. 3 and 4 and applicable to FIGS. 1 and 7-9, while a combination of dip 38 and fully doped MM core 14 may lead to the desired result—substantially undistorted propagation of and amplification of fundamental mode $LP_{01}$—amplifier 12 may have different configurations capable of achieving the same results. For example, MM core 14 may have a ring-shaped dopant profile 45 that does not cover the entire core area. In particular, gain region or dopant profile 45 surrounds the central region of the refractive index and terminates at a distance from the periphery thereof. The gain region is configured so as to include two power peak regions 40 and 42 (FIG. 4), respectively, of the ring field profile of the fundamental mode. As a result, the amplifications of power peaks 40, 42 provides for a significant gain to the fundamental mode while the central HOMs, such as $LP_{02}$, experience no or insignificant gain.

Turning to FIG. 6 discussed in conjunction with FIG. 1, pump unit 18 includes a passive central fiber 46 provided with a MM core 48 and a plurality of peripheral feeding fibers 50 each carrying light from a light source. The peripheral and central fibers 50 and 46, respectively, are operatively connected to one another and form a combiner. The output end 36 of the combiner is mechanically treated to shape the end of MM core 48 of central fiber 46 substantially identically to the output end of MM active core 14 at output end 20 of amplifier 12. Furthermore, peripheral fibers 50 after the treatment of pump's end 36 form a body having its outer diameter substantially match that one of cladding 16 at amplifier's output end 20. The substantial matching between cores 14 and 48 of the respective active MM and central passive fibers provides for a substantially lossless coupling of the fundamental mode with the ring field profile into central fiber 48 without noticeable excitation of HOMs.

Returning to FIG. 1, passive central MM fiber 46 is also provided with a dip configured substantially identically to dip 38 shown in FIG. 4. As a consequence, MM core 48 of central passive fiber 46 continues to support the fundamental mode with the ring field profile. However, for practical purposes, it is desirable to have an output radiation in substantially a fundamental mode with Gaussian field profile. Accordingly, the downstream end of central fiber 46 is fused to a passive MM delivery fiber 52 which, like the respective fibers 12 and 46, has a MM core with a dip configured to transform the ring field profile into the Gaussian one. In particular, the dip of the delivery fiber's core gradually narrows to an output 54 causing gradual shaping of the ring profile into the Gaussian one. The cladding 53 of fiber 52 has an input end with an outer diameter larger than the outer diameter of fiber 46 and an output frustoconical end. The cladding 53 receives light propagating along the cladding of output fiber 46 and, therefore, prevent this light from damaging environment along most sensitive stretches of system 10. The frustoconical end of delivery fiber 52 allows the received cladding-supported light to couple out of fiber 52 at the desired point before it may mess up with the core-supported light at the output of system 10. The output end 54 of delivery fiber 52 is operatively connected to a quartz beam expander 56 configured to somewhat lower the density of core-supported light and minimize the environmental hazard which is posed by a high power SM output beam. In particular, expander 56 has a polygonally-shaped cross-section or any other cross-section in which output regions advantageously have a cross-section greater than that one of the input end of the expander.

FIG. 7 illustrates a modification of the end-pumping configuration of the present disclosure. In contrast to amplifier 12 shown in FIG. 1, an amplifier 56 has a double bottleneck cross-section. Accordingly, in addition to input end, transformer and amplifying regions 26, 30 and 32, respectively, a MM core 58 further has an output transformer region 60 and an output end region 62 which are configured substantially identically to respective input end 26 and input transformer region 30.

The geometry of double bottleneck-shaped amplifier 56 meets the goals of the disclosure, i.e., a substantially lossless coupling of input SM radiation, minimal or no excitation of HOMs and relatively high threshold for nonlinearities. The substantially lossless light coupling and minimal HOM excitation are realized by matching the geometry of end input region 26 with the fused thereto output region of SM passive fiber 24, as discussed in detail in reference to FIG. 1. In addition, core 58 of amplifier 56 includes a dip formed in the refractive index of core 58 and configured in accordance with the shape and dimension shown in respective FIGS. 2 and 4. In particular, the dip, extending along input end region 26, is small enough to not disturb a Gaussian field profile of excited fundamental mode. The dip further expands along input transformer region 30 and has its largest dimension along amplifying region 32 so as to gradually transform the Gaussian field profile into the ring one which provides for a larger effective area of fundamental mode than that one of the Gaussian profile.

The addition of output transition and end regions 60 and 62, respectively, provide for gradually diminishing dimension of the dip along the output transformer region which gradually transforms the ring field profile into the Gaussian one. The output end region 62 of core 58 is configured with the small dip which does not affect the Gaussian profile of fundamental mode coupled into MM core of combiner's central fiber 46. The combiner is configured in accordance with the structure disclosed in regard to FIG. 1.

The MM active, central and feeding fibers—components of the SMHP fiber laser system of FIGS. 1 and 7—preferably, but not necessarily, all have a refractive step-index profile. The input SM fiber 24 is preferably configured with a W profile.

Further embodiments of the disclosed SMHP fiber laser system are configured in accordance with a side-pumping technique. Similar to the above disclosed configuration, the disclosed SMHP fiber laser system based on the side pumping technique allows for a substantially lossless coupling of light, supporting substantially only a fundamental mode and having a high threshold for nonlinearities, as disclosed below.

Figure 8:
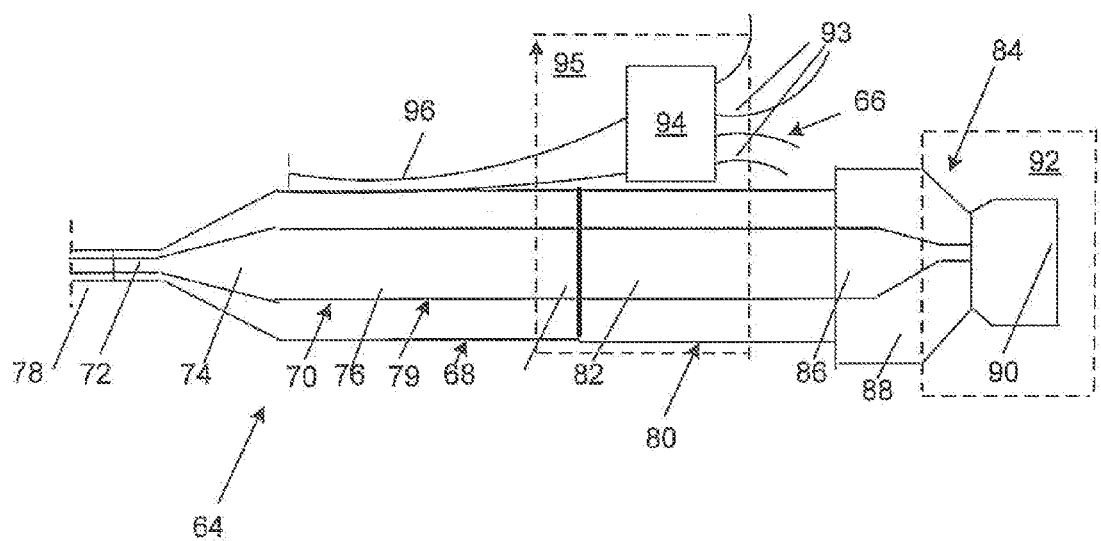
FIG. 8 illustrates another embodiment of the disclosed system utilizing a side-pumping arrangement.

FIG. 8 illustrates a SMHP fiber laser system 64 including a waveguide which supports a SM radiation and a pump unit 66 launching pump light into the waveguide in accordance with a side-pumping technique. The waveguide includes an amplifier 68 configured similarly to amplifier 12 of FIG. 1. In particular, amplifier 68 includes a MM core 70, capable of supporting substantially only a fundamental mode, and one or more claddings. The core 70, thus, has a uniformly dimensioned input end region 72 configured to receive a SM radiation from a SM passive input fiber 78 so that substantially only a fundamental mode with Gaussian field profile is excited. Reaching a frustoconical input transformer region 74, the fundamental mode propagates therealong without coupling to HOM and further is supported and amplified along a uniformly dimensioned amplifying region 79. To raise a threshold for nonlinearities, MM core 76 is provided with the dip which is configured along input end region 72 in accordance with FIG. 3 and along amplifying region 78 in accordance with FIG. 4. Accordingly, as the fundamental mode with Gaussian field profile propagates along input transition region 74, its shape is transformed from a Gaussian field profile into a ring field profile.

To prevent coupling losses at the output of amplifier 68, a signal output MM passive fiber 80 has a core 82 with an input end configured to geometrically and optically (MFD) match the output end of MM core 76 so that substantially only the coupled fundamental mode is supported by core 82. The ring shape of the fundamental mode also remains undisturbed due to a dip in signal fiber 80 which is configured similarly to the dip provided in amplifying region 78 of doped MM core 76 in accordance with FIG. 4. The outer diameters of respective MM fibers 68 and 80 are likewise substantially matched one another. A passive delivery fiber 84 is also provided with a MM core 86 dimensioned to receive and support substantially only the fundamental mode. The outer diameter of cladding 88 of delivery fiber 84 preferably is larger than that one of signal fiber 80 for the reasons explain in reference to FIG. 1. The output end of MM core 86 tapers inwards so that the dip of the refractive index eventually and gradually reshapes the ring field profile into the Gaussian field profile of the fundamental mode. The tapered output end of delivery fiber 88 is operatively connected to a quartz block 90 placed within a connector 92.

The pump unit 66 is configured with a plurality of light sources such as laser diodes or, preferably a plurality of SM fiber lasers combined together into a combiner 94 which has a MM pump light launching fiber 96. The launching fiber 96 gradually tapers as it extends along and preferably, but not necessarily, fused to amplifier or active fiber 68 along amplifying region 79 of MM core 76. The details of the disclosed launching fiber are well explained in U.S. Pat. No. 5,999,673 owned in common by the Assignee of the current application and fully incorporated herein by reference. The fusion region between fibers 96 and 68 coincides substantially with the whole tapered region of launching fiber 96. The length and geometry of the tapered region are selected to provide for maximum absorption of the pump light along the amplifying region of core 76 of amplifier 64, which is doped with rare-earth or transitional metals ions. The fused ends of respective MM active and signal fibers 68 and 80 and combiner 94, which is configured as a MM passive fiber, are coupled together by a coupler 95 made of material with a refractive index smaller than that one of enclosed within the coupler fiber claddings. The coupler 95 is this configured to prevent coupling of cladding-supported modes out into the environment.

The SMHP fiber lasers system 64 may operate at a variety of wavelength depending on the configuration of SM pump fiber lasers 93 and active medium of active MM fiber 10. For example, the output beam of system 64 may be radiated at a wavelength of above about 1530 nm if SM pump lasers each have a Raman configuration core 76 is doped with Er ions. In a further example, SM pump lasers 92 may be configured as an Yb/Er laser launching pump light at a wavelength between about 1530 and about 1540 nm into Er doped fiber 68 of SMHP system 64 10 which outputs the SM radiation at a wavelength of about 1560-1600 nm. Still further, Yb/Er co-doped SM pump lasers 92 may each radiate light at a wavelength between about 1550-1600 nm, whereas core 76 is doped wit Tm outputting the output SM radiation beam at a wavelength ranging between about 1750-2100 μm. In still another possible modification of high power system 64, SM pump lasers 92 each are configured as Nd doped fiber launching pump light within a 920-945 nm range into Yb doped fiber 68 generating a substantially SM output beam at a wavelength from about 974 nm to about 1 μm. Finally, Yb doped SM pump fiber lasers 92 may generate a pump output at a wavelength of about 1000-1030 nm which is launched into MM active fiber 68 doped with Yb ions and, thus, outputting an amplified SM radiation at a wavelength ranging from about 1050 to about 1080 nm. See U.S. Pat. No. 7,593,435 commonly owned with the present application and fully incorporated herein by reference.)

Figure 9:
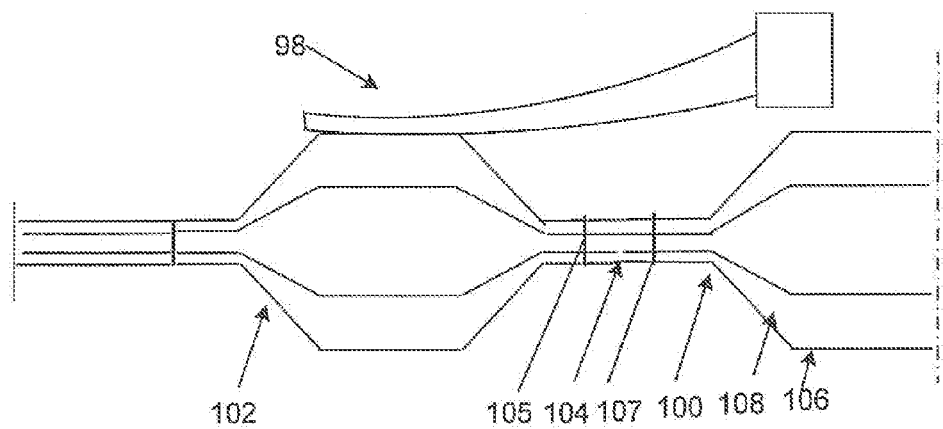
FIG. 9 illustrates still another embodiment of the disclosed system configured with a side pumping arrangement.

FIG. 9 illustrates a further modification of disclosed SMHP fiber laser system 100 having a side pumping configuration in combination with a pump unit 98 which is configured substantially identically to pump unit 66 discussed immediately above. On the other hand, the waveguide of SMHP system 100 has an amplifier 102 configured similarly to amplifier 56 of FIG. 7 and, thus, having a double bottleneck cross-section and a dip in the refractive index which is disclosed in reference to FIGS. 2-4. Preferably, but not necessarily, the core of amplifier 102 is doped so as to have a ring dopant profile discussed in detail in reference to FIG. 5.

A signal passive SM fiber 104 is configured to have its core and cladding dimensioned similarly to the respective core and cladding of amplifier 102. As a consequence, a SM radiation with Gaussian profile, emitted from the output end of amplifier 102, which is fused to the opposing end of signal fiber 105, is coupled into signal SM passive fiber 104 without noticeable losses and substantial excitation of HOM. A MM delivery passive fiber 106, preferably configured with a W refractive index profile, is fused to the output end of signal fiber 107 without noticeable losses and HOMs excitations because of the substantially identical geometry of the fused ends of these fibers. To somewhat mitigate high power densities, delivery fiber 106 may both its core and cladding have respective bottleneck-shaped cross-sections 108.

The disclosed high power SM fiber laser system may be incorporated in both pulsed and CW configurations. Accordingly, the threshold for other nonlinear effects, such as self phase modulation, 4-wave mixing and even SBS for pulsed fiber laser systems along with SBS for narrow line and 4-wave mixing for broad line CW systems may be raised.

The host material of the MM core 12 of all of the disclosed above active fibers or amplifiers may include silica, but preferably the host material of the core includes phosphate. The latter is advantageous because the concentration of dopants in phosphate may be substantially higher than in silica without generating clusters, which lead to the degradation of waveguide. Typically, the generation of clusters in Si is observed when the concentration of ions, such as Yb, reaches about 1000-2000 ppm. In contrast, the phosphate host material allows for the rare-earth ion concentration of up to about 5000 ppm and higher. As mentioned above, the dopant ions may be selected from rare earth and transitional metals.

It will be apparent to those skilled in the art that various modifications and variations can be made in the presently disclosed laser powerful system. Thus, it is intended that the present disclosure cover the modifications and variations of this disclosure provided they come within the scope of the appended claims and their equivalents.

The invention claimed is:

1. A single-mode high power (SMHP) fiber laser systems comprising:

a multimode (MM) active fiber with a core having a bottleneck-shaped cross-section, the core being configured to support substantially only a fundamental mode at a desired wavelength and shape a field profile of the fundamental mode between Gaussian- and ring-shaped field profiles as the fundamental propagates along the core; and
a pump unit operative to generate a pump beam which is coupled into the MM active fiber outputting a radiation substantially in the amplified fundamental mode.

2. A single-mode high power (SMHP) fiber laser system comprising:
a multimode (MM) active fiber with a core configured to support substantially only a fundamental mode at a desired wavelength and shape a Gaussian field profile of the fundamental mode into a ring field profile as the fundamental propagates along the core, the active MM fiber further includes at least one cladding surrounding and coextending with the core, the core comprising:
a uniformly dimensioned, input end region guiding the fundamental mode with the Gaussian field profile,
a uniformly dimensioned amplifying region having a diameter larger than that one of the input region and operative to amplify the fundamental mode with the ring field profile, and
a frustoconical input transforming region bridging opposing ends of respective input and amplifying regions and configured to gradually transform the Gaussian field profile of the fundamental mode into the ring field profile thereof;
the core of the MM active fiber being configured with a refractive step index profile having a central dip which extends between opposite ends of the MM fiber; and
a pump unit operative to generate a pump beam which is coupled into the MM active fiber outputting a radiation substantially in the amplified fundamental mode.

3. The SMHP fiber laser system of claim 2, wherein the pump unit is configured with:
a central signal central passive fiber directly fused to an output end of the MM active fiber and having a MM core modematched to the core of the amplifying region of the active fiber so as to substantially losslessly receive the fundamental mode with the ring field profile therefrom and guide it without substantial coupling to high order modes (HOMs),
a plurality of peripheral fibers surrounding the central signal MM fiber and operatively connected to one another so as to launch the pump beam into the cladding of the output end region of the MM active fiber.

4. The SMHP fiber laser system of claim 3, wherein the core of the MM central signal fiber is configured with a refractive step index profile provided, with a central dip which is configured similarly to and aligned with the dip of amplifying region of the MM active fiber at a splice between the MM fibers so as to support propagation of the fundamental mode with the ring field profile.

5. The SMHP fiber laser system of claim 4 further comprising a passive MM delivery fiber fused to the central signal MM fiber of the pump unit and having a core configured substantially identically to the core of the MM central signal fiber, an outer diameter of the central fiber being larger than an outer diameter of the delivery fibers.

6. The SMHP fiber laser of claim 5, wherein the delivery fiber has a tapering output end, the core of the delivery fiber being configured with a step index profile having a dip which narrows along the output end of the delivery fiber so as to reshape the ring field profile of the fundamental mode into the Gaussian field profile thereof.

7. The SMHP fiber laser system of claim 6 further comprising a quartz beam expander configured to expand the fundamental mode with the Gaussian field profile received from the delivery fiber.

8. The SMHP fiber laser system of claim 1, wherein the core of the MM active fiber has a refractive step index profile provided with a gain medium, the gain medium being doped across an entire area of the core or across a ring-shaped region thereof located between central and peripheral regions of the core and configured to amplify substantially only the fundamental mode, the ring-shaped profile being configured with two power peaks spaced from a central axis of the core in opposite lateral directions and a valley bridging the power peaks.

9. The SMHP fiber laser system of claim 2 further comprising a SM passive input fiber launching an input radiation in a SM into the input end of the MM active fiber, the core extending along the input region of the MM active fiber and a core of the SM input fiber being configured so that mode field diameters of the respective single and fundamental modes substantially match one another.

10. The SMHP fiber laser system of claim 2, wherein the core of the MM active fiber further configured with:
a frustoconical output transforming region narrowing from the amplifying region,
an output end region configured substantially identically to the end input region and running from the output transforming region,
the dip running along the output transforming region being configured to gradually transform the ring field profile of the fundamental mode into the Gaussian profile thereof propagating further along the output end region which is spliced to the pump unit.

11. The SMHP fiber laser system of claim 10, wherein the pump unit is configured with:
A MM central signal passive fiber fused to the MM active fiber, the central fiber having a core configured to modematch the output end core region of the MM active fiber so as to losslessly receive and guide the fundamental mode with the Gaussian profile,
a plurality of peripheral fibers surrounding the central signal passive fiber and delivering the pump beam into the cladding of the MM active fiber which surrounds the output end region of the core of the MM active fiber.

12. The SMHP fiber laser system of claim 11, wherein the central dip, extending along the input and output end regions, is relatively small so as to substantially prevent distortion of the Gaussian field profile, the dip extending through the amplifying region being larger than that one along the end regions and configured to support the ring field profile of the fundamental mode.

13. The SMHP fiber laser system of claim 2, wherein the pump unit is configured with:
a source of the pump beam; and
a feeding MM fiber receiving the pump beams and having a portion thereof extend along and be operatively connected to a stretch of the MM active fiber substantially along the amplifying region of the core.

14. The SMHP fiber laser system of claim 13 further comprising a signal MM passive fiber having one end thereof fused to an output end region of the MM active fiber and configured with a core which is dimensioned substantially identically to the output end core region of the MM active fiber so as to provide for a substantially lossless coupling of the fundamental mode into the core of the signal fiber.

15. The SMHP fiber laser system of claim 14 further comprising a MM delivery fiber fused to another end of the central signal fiber so that the fundamental mode is coupled into a core of the delivery fiber substantially losslessly and without coupling thereof to HOMS, the cores of the respective fused active, signal and delivery fibers each having a step index profile provided with the central dip.

16. The SMHP fiber laser system of claim 13, wherein the core of the delivery fiber has an output frustoconical transforming region narrowing into a uniformly dimensioned output region, the dip is configured with:
 a relatively small width selected to preserve the Gaussian field profile of the fundamental mode along opposite input and output end regions of the respective active and delivery fibers,
 a relatively large width selected to preserve the ring profile of the fundamental mode between the transforming input and output regions of the respective active and delivery fibers, and
 gradually expanding and narrowing width selected to shape the Gaussian profile into the ring profile of the fundamental mode and conversely along respective transforming input and output regions of the active and deliver fibers, respectively.

17. The SMHP fiber laser system of claim 16 further comprising a quartz beam expanding block.

18. The SMHP fiber laser system of claim 10, wherein the pump unit is configured with:
 a source of the pump beam; and
 a feeding MM passive fiber receiving the pump beam and having a tapering portion thereof extend along and operatively connected to the MM active fiber along the amplifying region of the core.

19. The SMHP fiber laser system of claim 10 further comprising
 a SM signal fiber fused to the output end core region of the MM active fiber and configured substantially identically thereto so that the fundamental mode with the Gaussian field profile is coupled into the signal fiber without substantial losses and excitation of HOMs; and
 MM passive delivery fiber with an input end fused to an output end of the SM signal fiber and configured substantially identically therewith so that the fundamental mode with the Gaussian profile is coupled into an input region of a core of the delivery fiber without substantial losses and excitation of HOMs.

20. The SMHP fiber laser system of claim 19, wherein the core of the MM passive delivery fiber has a frustoconical region expanding from the input region thereof, and a central region larger than the input region of the MM passive fiber.

* * * * *